Dec. 7, 1943.   J. C. THOMAS   2,336,315
SUPPORTING DEVICE
Filed Aug. 23, 1939    3 Sheets-Sheet 1
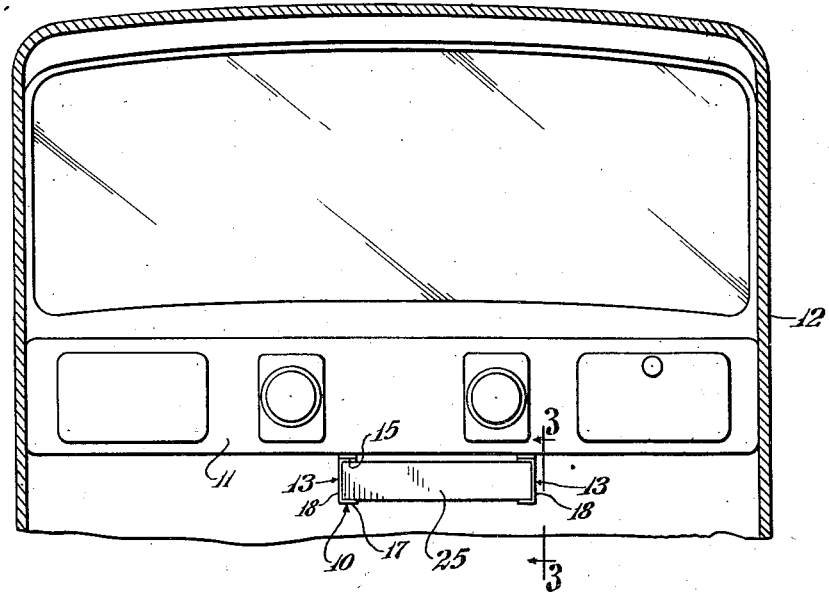
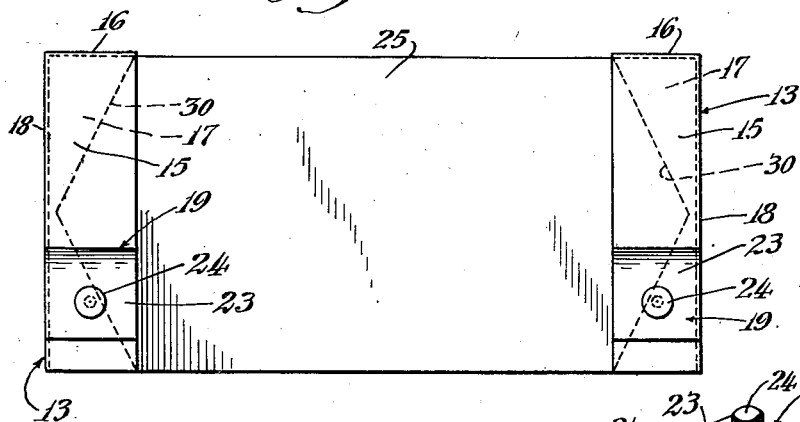
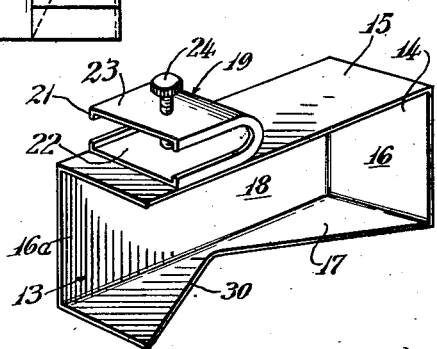
Inventor:
Joseph C. Thomas
By Belt, Wallace & Camm
His Attorneys Dec. 7, 1943.    J. C. THOMAS    2,336,315
SUPPORTING DEVICE
Filed Aug. 23, 1939    3 Sheets-Sheet 2
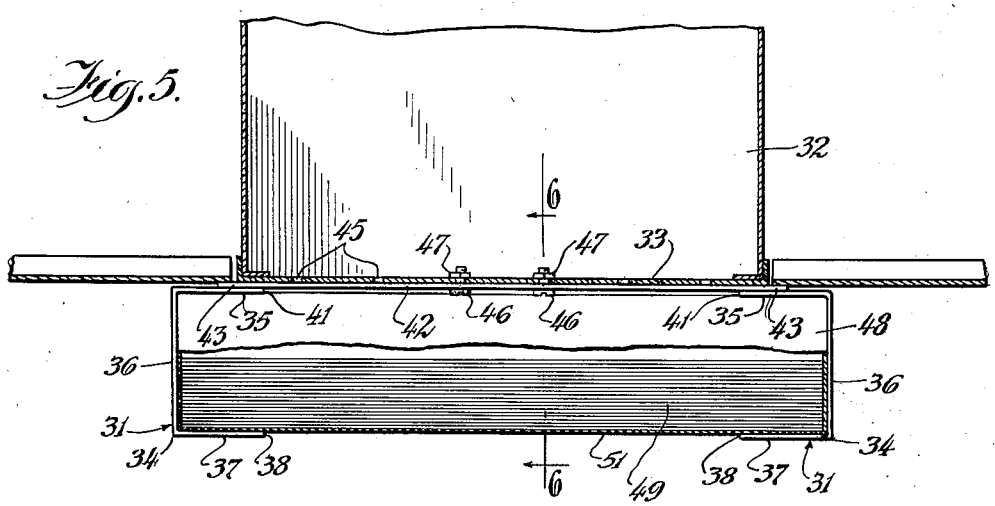
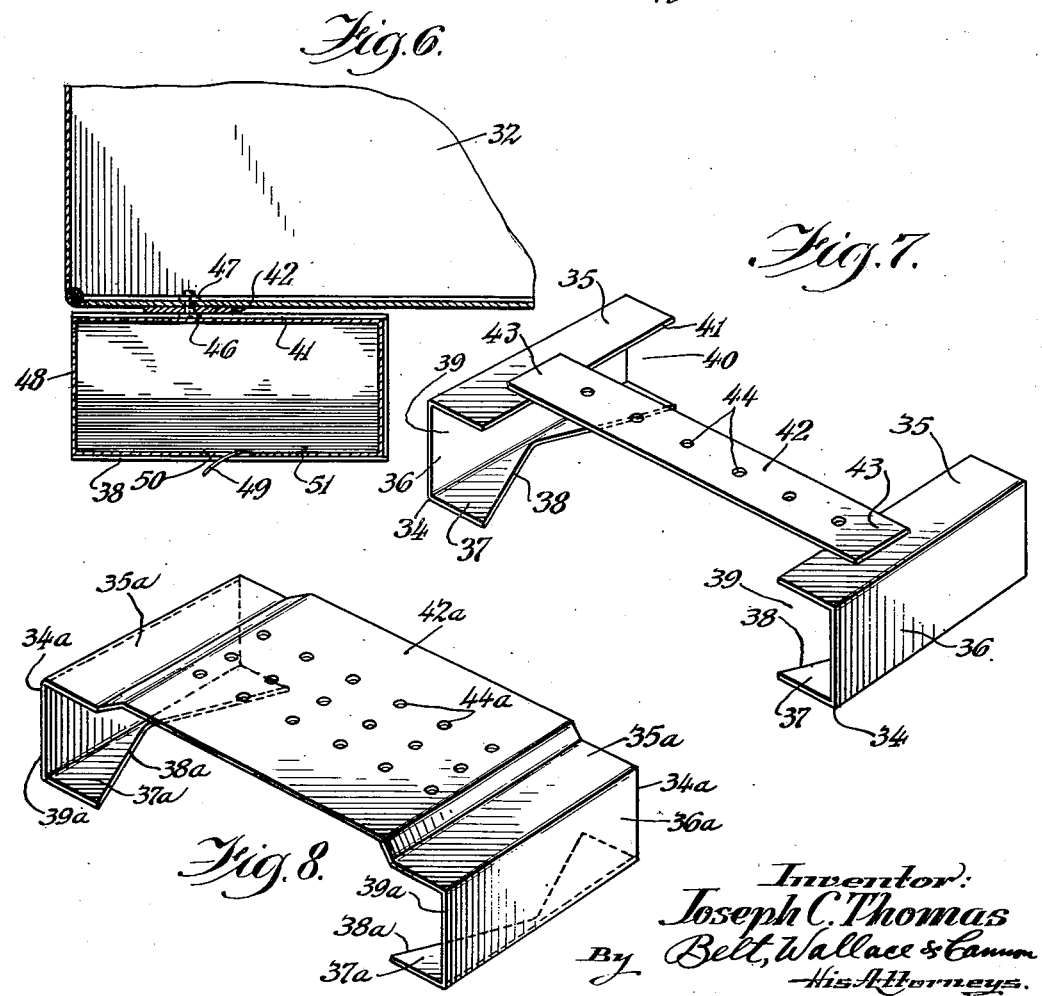
Inventor:
Joseph C. Thomas
By Belt, Wallace & Cannon
His Attorneys.

Dec. 7, 1943.    J. C. THOMAS    2,336,315
SUPPORTING DEVICE
Filed Aug. 23, 1939    3 Sheets-Sheet 3
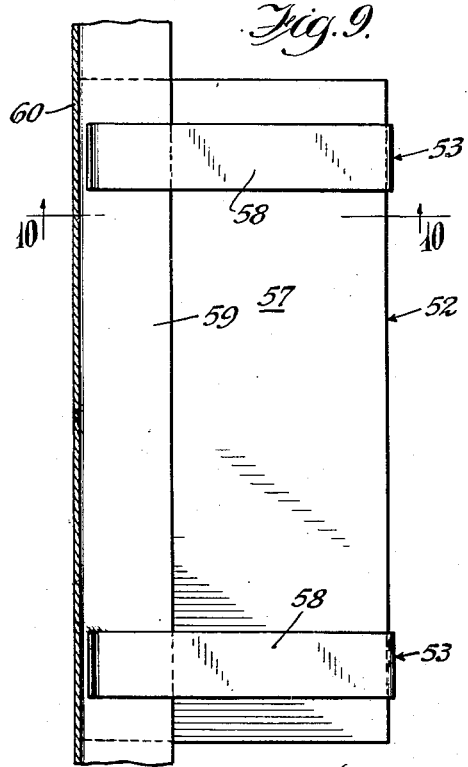
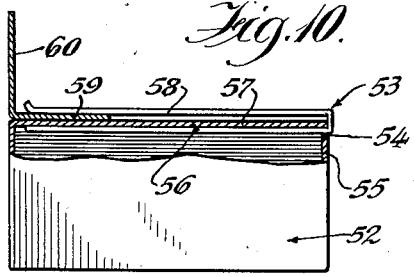
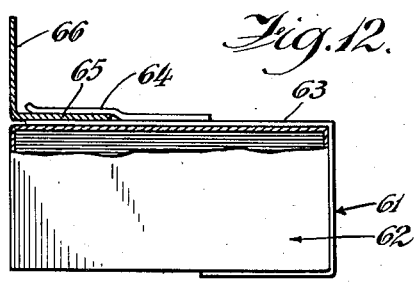
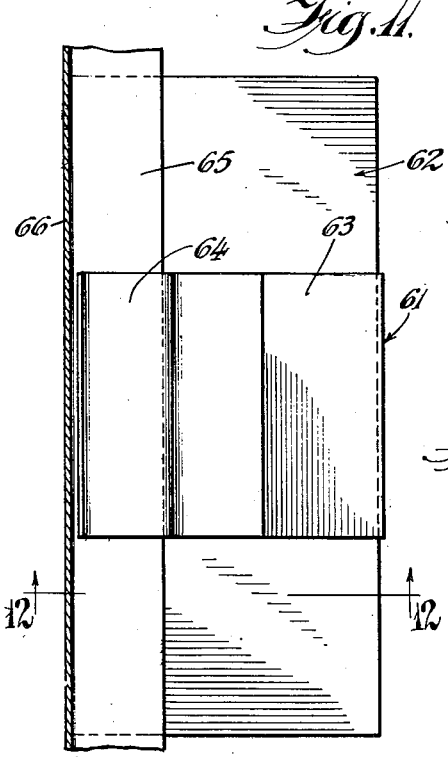
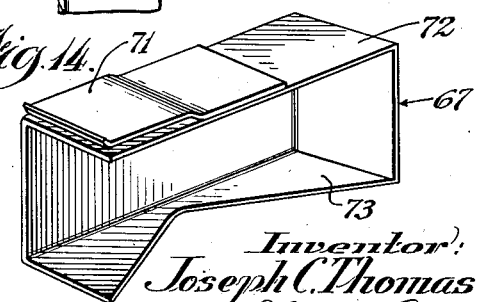
Inventor:
Joseph C. Thomas
By Belt, Wallace & Cannon
His Attorneys Patented Dec. 7, 1943

2,336,315

UNITED STATES PATENT OFFICE 2,336,315

SUPPORTING DEVICE

Joseph C. Thomas, Akron, Ohio, assignor, by mesne assignments, to International Cellucotton Products Company, Chicago, Ill., a corporation of Delaware Application August 23, 1939, Serial No. 291,475

10 Claims. (Cl. 211—86)

This invention relates to a supporting device which is particularly constructed and adapted for supporting a dispensing container or carton filled with disposable paper tissues in an automotive vehicle.

An object of the invention is to construct and arrange the new supporting device in such a manner that it may readily be installed in a convenient and accessible position in an automotive vehicle for the purpose of supporting a dispensing carton or box of disposable paper tissues in such a position and manner that such tissues may be readily removed by the occupants of the vehicle from the dispensing carton in which they are sold and in which they are available upon the market.

Another object of the invention is to so construct and arrange the new supporting device in such a manner that it may readily be mounted upon the so-called dash or instrument panel of an automotive vehicle so as to support a dispensing carton of disposible paper tissues in a position such that they are readily accessible to the occupants of the front seat of the vehicle.

Other objects will appear hereinafter.

The invention consists in the novel combination and arrangement of parts to be hereinafter described and claimed.

The invention will be best understood by reference to the accompanying drawings showing the preferred form of construction and in which:

Fig. 1 is an elevational view, partly in section, illustrating a preferred form of the new supporting device mounted in position of use upon the instrument panel of an automotive vehicle;

Fig. 2 is a top plan view of a preferred form of the new supporting device;

Fig. 3 is an end elevational view, partly in section, on line 3—3 in Fig. 1;

Fig. 4 is a perspective view of the form of the new supporting device which is illustrated in Figs. 1, 2 and 3;

Fig. 5 is a view partly in section and partly in elevation, illustrating a modified form of the new supporting device;

Fig. 6 is a sectional view, on line 6—6 in Fig. 5;

Fig. 7 is a perspective view of the modified form of supporting or holding device which is illustrated in Figs. 5 and 6;

Fig. 8 is a perspective view illustrating another modified form of the new supporting device;

Fig. 9 is a sectional view, partly in plan, illustrating another modified form of the invention;

Fig. 10 is a sectional view on line 10—10 in Fig. 9;

Fig. 11 is a sectional view, partly in plan, illustrating another modification of the invention;

Fig. 12 is a sectional view on line 12—12 in Fig. 11;

Fig. 13 is a sectional view, partly in plan, illustrating a further modification of the invention; and Fig. 14 is a perspective view of the form of the invention which is illustrated in Fig. 13.

A preferred form of the new supporting device is illustrated in Figs. 1 to 4, inclusive, of the drawings, wherein it is generally indicated at 10, and is shown mounted upon the so-called dash board or instrument panel 11 of an automotive vehicle, which is indicated generally at 12.

The new supporting device includes a pair of supporting members 13 each of which is preferably formed of a metal stamping and each of which includes a body having an open side 14, a top wall 15, end wall 16, an open end 16a, a back or rear wall 18 and a bottom wall 17 which is indented, as at 30, for a reason which will be explained hereinafter.

Each of the members 13 also includes means, generally indicated at 19, for attaching the member 13 to the channel-shaped lower end portion or flange 20 which is commonly formed upon and at the lower end of the dashboard or instrument panel in automobiles of many models or types, (Fig. 3). Each of the attaching means 19 includes a generally U-shaped attaching member 21 and each of these attaching members 19 also includes a bottom portion 22 which is preferably soldered or otherwise suitably fastened to the top wall 15 of the corresponding member 13. Each of the attaching members 19 also includes a top portion 23 and adjustably mounted in each of these top portions 23 is a clamping screw 24.

In the use of the form of the new supporting device which is illustrated in Figs. 1 to 4, inclusive, the end portions of a dispensing box or carton 25 of disposable paper tissues may be inserted into the members 13 through the open sides 14 thereof, whereupon the members 13, with the dispensing carton 25 thus held therebetween, may be mounted upon the channel-shaped lower end portion or flange 20 of the dash board or instrument panel 11 of the automotive vehicle 12 by inserting the U-shaped attaching elements 19 onto the said flange 20, in the manner illustrated in Fig. 3, and then adjusting the clamping screws 24 so that they engage the flange 20, it being noted that the upwardly turned end portion 26 of the flange is then disposed between the top and bottom walls 23 and 22 of the clips or attaching elements 21.

It will also be noted that when the dispensing carton or box 25 of disposable paper tissues is thus mounted in position of use upon an automotive vehicle the disposable paper tissues 27 contained therein may be conveniently withdrawn therefrom through the dispensing outlet 28 which is shown as being formed in the bottom wall 29 of the dispensing carton 25.

The dispensing carton 25 is shown mounted in inverted or upside down position so as to position the dispensing outlet 28 at the bottom thereof, and thus facilitate withdrawal of the disposable paper tissues 27 therefrom. It is to be understood, however, that this dispensing outlet 28 is customarily formed in the top wall of the dispensing carton.

In order to facilitate the removal or withdrawal of the disposable paper tissues 27 from the dispensing outlet 28 of the carton 25 the bottom walls 17 of each of the members 13 is indented, that is to say, is formed with a V-shaped indentation the apex of which extends inwardly from the open side 14 of the member 13 toward the rear wall 18 thereof.

It will be seen, therefore, that when a dispensing carton 25 of the disposable paper tissues 27 is thus mounted in position of use, as shown, the tissues 27 are accessible at all times to the occupants of the front seat and may be readily withdrawn from the dispensing carton 25, thus encouraging the use of such tissues, and when the carton 25 has been emptied it may be replaced by loosening the clamping screws 24, spreading the members 13 so as to withdraw or remove the same from the end portions of the carton 25, and then replacing the thus removed empty carton with a new and full carton.

In some types or models of automotive vehicles the channel-shaped flange 20—26 is lacking and in order to accommodate the present invention to use upon or with such types of automotive vehicles the modified forms of the invention which are illustrated in Figs. 5 to 8, inclusive, are provided.

The modified form of the invention which is illustrated in Figs. 5 to 7, inclusive, is generally indicated at 31 and is shown as being mounted upon the bottom wall 33 of the so-called glove compartment which is commonly formed upon the instrument panel of automotive vehicles of many models or types.

This form of the invention includes a pair of members 34 each of which includes a top wall 35, a rear or back wall 36, and a bottom wall 37 which is indented, as at 38, in the same manner and for the same reason as are the bottom walls 17 in the member 13.

The members 34, however, differ from the members 13, among other ways, in that each of the members 34 has open ends 39 and 40 and an open side 41.

In the modified form of the invention which is illustrated in Figs. 5, 6 and 7 the two supporting or holding members 34, which are preferably formed as metal stampings, are tied together by a tie strap or bar 42 the end portions 43 of which are soldered or otherwise securely fastened to the top walls 35 of the members 34. This tie member 42 is provided with a row of spaced holes 44, said row extending lengthwise of the said tie bar 42.

In the use of the modified form of the invention which is illustrated in Figs. 5, 6 and 7, the members 34 may be fastened in position of use upon, and so as to be suspended from, the bottom wall 33 of the glove compartment 32 of an automotive vehicle by forming suitable holes 45 in the said bottom wall 33 of the glove compartment 32, these holes 45 being spaced to correspond to the spacing of the holes 44 in the tie bar 42 and so as to align with the latter, then inserting bolts 46 upwardly through two or more pairs of the aligned holes 44—45, and then tightening nuts 47 upon the bolts 46 inwardly of the glove compartment 32 so as to securely hold the members 36 in position of use.

When the members 36 are thus mounted in position of use, a dispensing carton 48 of disposable paper tissues may be mounted therein by sliding the same onto the bottom walls or shelves 37 through the open ends 39 of the members 34, whereupon the disposable paper tissues 49 may be withdrawn, as desired, from the dispensing carton 48 through the dispensing outlet 50 which is formed in the bottom wall 51 of the dispensing carton 48, and when the carton 48 has been emptied it may readily be withdrawn from the members 34, through the open ends 39 thereof, and replaced by a new and full carton.

Another modified form of the invention is illustrated in Fig. 8. This form of the invention, however, is substantially similar to the form of the invention which is illustrated in Figs. 5, 6 and 7, and those parts in the form of the invention which is illustrated in Fig. 8 which correspond structurally and functionally to similar parts in the form of the invention shown in Figs. 5, 6 and 7, are given the same reference numerals followed by the letter "a".

As stated, the form of the invention as illustrated in Fig. 8 is substantially similar to the form of the invention shown in Figs. 5, 6 and 7 except for the tie bar 42a which, instead of being formed separately from the members 34, as in the form of the invention shown in Figs. 5, 6 and 7, is formed integrally with the parts 34a and is preferably of the same width as the latter, these parts being formed, preferably, as a single metal stamping.

Another modification of the invention is illustrated in Figs. 9 and 10 of the drawings and is shown as being associated with a box of disposable paper tissues which is generally indicated at 52. In this form of the invention a pair of U-shaped clamping members 53 is provided, and each of these clamping members is adapted to be inserted through a slot 54 which is formed in the wall 55 of the box or container 52 so that the lower arm 56 of each of the members 53 projects under the top wall 57 of the container and the upper arm 58 of each of the clamping members 53 projects above the said top wall 57 of the box 52.

It will likewise be noted, in this connection, that when in position of use the inner end portions of the clamping members 53 are adapted to clampingly engage the laterally or horizontally extending flange 59 of the instrument panel 60 of an automotive vehicle so as to releasably hold the box of disposable paper tissues 52 thereon.

A further modification of the invention is illustrated in Figs. 11 and 12 and this form of the invention comprises a single U-shaped clamping member 61 which is adapted to clampingly embrace a box of disposable paper tissues 62. In this form of the invention the clamping member 61 has a spring clip 64 formed on the top wall 63 thereof so that the laterally or horizontally extending flange 65 of the instrument panel may be releasably clamped thereby and the box of disposable paper tissues 62 thus releasably mounted on the instrument panel 66—66 of an automotive vehicle.

An additional modification of the invention is illustrated in Figs. 13 and 14 and is therein shown as associated with a box of disposable paper tissues 68 which is adapted to be removably mounted upon the laterally extending flange 69 of the instrument panel 70 of an automotive vehicle.

In this form of the invention a pair of complementary holders 67 (Fig. 14) is provided, each adapted to receive the end portion of the box 68, each of these members 67 being similar to the members 13 (Fig. 4) but differing therefrom in the means employed for clamping the said members 67 on the flange 69 of the instrument panel 70. In the form of the invention which is illustrated in Figs. 13 and 14 this clamping means consists of a U-shaped clip or clamping element 71 which is attached to the top wall 72 of each of the members 67, the flange 69 being clampingly engaged between the parts 71—72 and the end portions of the box 68 being supported upon the bottom walls 73 of the members 67 in the manner discussed hereinbefore in connection with the members 13 (Fig. 4).

From the foregoing description, taken together with the accompanying drawings, it will be seen that the present invention provides a relatively cheap and inexpensive device which may be readily attached to the so-called dash board or instrument panel, or to the so-called glove compartment, of an automotive vehicle for supporting a dispensing carton of disposable paper tissues in such a position thereon that such tissues are readily accessible at all times to the occupants of the front seat of the vehicle.

While I have illustrated and described preferred forms of construction for carrying my invention into effect, these are capable of variation and modification, without departing from the spirit of the invention. I, therefore, do not wish to be limited to the precise details of construction set forth, but desire to avail myself of such variations and modifications as come within the scope of the appended claims.

I claim:

1. A device for supporting a dispensing carton of disposable paper tissues upon a flange formed on the instrument panel of an automotive vehicle, comprising a pair of supporting members each including a part adapted to support an end portion of said dispensing carton, and means for attaching the said supporting members to the said flange.

2. A device for supporting a dispensing carton of disposable paper tissues upon a flange formed on the instrument panel of an automotive vehicle, comprising a pair of supporting members each including a part adapted to support an end portion of said dispensing carton, and means carried by the said supporting members for attaching the same to the said flange.

3. A device for supporting a dispensing carton of disposable paper tissues upon a supporting wall within the body of an automotive vehicle, comprising a pair of supporting members each including a top wall, a rear wall, and a bottom wall and having an open side opposite the said rear wall, each of the said supporting members being adapted to receive and support an end portion of said carton and the bottom wall of each of the said supporting members having a generally V-shaped indentation formed therein with the apex of each of said indentations extending inwardly from the said open side of each of the said supporting members toward the said rear wall of the same, and means for attaching the said supporting members to the said supporting wall.

4. A device for supporting a dispensing carton of disposable paper tissues upon a supporting wall within the body of an automotive vehicle, comprising a pair of supporting members each including a top wall, a rear wall, and a bottom wall and having an open side opposite the said rear wall, and the bottom wall of each of the said supporting members having a generally V-shaped indentation formed therein with the apex of each of said indentations extending inwardly from the said open side of each of the said supporting members toward the said rear wall of the same, and means for attaching the said supporting members to the said supporting wall, said attaching means including a pair of generally U-shaped attaching members each having a bottom portion fastened to the said top wall of one of the said supporting members, each of the said attaching members also including a top portion having an adjustable clamping screw mounted therein, the said attaching members being arranged and positioned upon the said top walls of the said supporting members so that a portion of the said supporting wall may be received and clamped between the top and bottom portions of the said attaching members by the said clamping screws.

5. A device for supporting a dispensing carton of disposable paper tissues upon a supporting wall within the body of an automotive vehicle, comprising a pair of supporting members each including a part adapted to support an end portion of said dispensing carton, said supporting device having a cut-away portion provided therein through which a disposable paper tissue may pass when the said disposable paper tissue is drawn out of the said dispensing carton, and means for attaching the said supporting members to the said supporting wall, said attaching means including a tie member extending between and secured to the said supporting members and provided with openings for the reception of attaching elements for attaching the said device to the said supporting wall.

6. A device for supporting a dispensing carton of disposable paper tissues upon a generally horizontally extending portion of the instrument panel of an automotive vehicle, comprising means for supporting the said dispensing carton in a generally horizontal position upon the said horizontally extending portion of the said instrument panel and means for attaching the said supporting means to the said portion of the instrument panel in which the said supporting means includes a pair of supporting members each including a generally horizontally extending part adapted to support an end portion of the said dispensing carton and in which the bottom wall of each of said supporting members is provided with an indentation through which the end portion of a disposable paper tissue may pass when the said disposable paper tissue is drawn downwardly out of the said dispensing carton through the dispensing outlet formed in the latter.

7. A device for supporting a dispensing carton of disposable paper tissues upon a supporting wall within the body of an automotive vehicle, comprising a pair of supporting members each including a top wall, a rear wall, and a bottom wall and having an open side opposite the said rear wall, each of the said supporting members being adapted to receive and support an end portion of said carton and the bottom wall of each of the said supporting members having a generally V-shaped indentation formed therein with the apex of each of said indentations extending inwardly from the said open side of each of the said supporting members toward the said rear wall of the same, and means for attaching the said supporting members to the said supporting wall, said attaching means including a clamping element carried by the top wall of each of said supporting members and the said clamping elements cooperating with the top walls of said supporting members to clampingly engage a portion of said supporting wall therebetween.

8. A device for supporting a dispensing carton of disposable paper tissues upon an interior structural member of an automotive vehicle, comprising supporting means for the said carton, said supporting means including a wall having a cut-out portion provided therein through which a disposable paper tissue may pass when the said disposable paper tissue is drawn out of the said dispensing carton, and means for attaching the said supporting means to the said structural member.

9. A device for supporting a dispensing carton of disposable paper tissues upon an interior structural member of an automotive vehicle, comprising supporting members including a top wall, a rear wall, a side wall and a bottom wall and having an open side opposite the said rear wall, each of the said supporting members adapted to receive and support an end portion of said carton, and means for attaching the said supporting members to the said structural member.

10. A device for supporting a dispensing carton of disposable paper tissues upon a generally horizontally extending structural element within the body of an automotive vehicle, comprising means for supporting said dispensing carton in a generally horizontal position upon the said horizontally extending structural element, said supporting means comprising a top member, a side member and a bottom member, a portion of at least one of said members being cut away to facilitate removal of said disposable paper tissues from the said dispensing carton supported by the said supporting means, and means for attaching the said supporting means to the said structural element.

JOSEPH C. THOMAS.